(12) United States Patent
Kim (10) Patent No.: US 10,969,826 B2
(45) Date of Patent: Apr. 6, 2021

(54) TRANSPARENT MEMBER HAVING FINE UNEVEN PORTIONS AND APPLIED TO PORTABLE DEVICE

(71) Applicant: Young Su Kim, Suwon-si (KR)

(72) Inventor: Young Su Kim, Suwon-si (KR)

(*) Notice: Subject to any disclaimer, the term of this patent is extended or adjusted under 35 U.S.C. 154(b) by 46 days.

(21) Appl. No.: 16/464,432

(22) PCT Filed: Nov. 23, 2017

(86) PCT No.: PCT/KR2017/013384
§ 371 (c)(1),
(2) Date: May 28, 2019

(87) PCT Pub. No.: WO2018/101672
PCT Pub. Date: Jun. 7, 2018

(65) Prior Publication Data
US 2020/0341513 A1    Oct. 29, 2020

(30) Foreign Application Priority Data

Dec. 1, 2016 (KR) .................. 10-2016-0162726
Apr. 13, 2017 (KR) .................. 10-2017-0047702

(51) Int. Cl.
| | | |
|---|---|---|
| G02B 1/11 | (2015.01) | |
| G02B 1/14 | (2015.01) | |
| G06F 1/16 | (2006.01) | |
| G02B 1/18 | (2015.01) | |
| H04B 1/3888 | (2015.01) | |

(52) U.S. Cl.
CPC ............. G06F 1/1637 (2013.01); G02B 1/14 (2015.01); G02B 1/18 (2015.01); G06F 1/1626 (2013.01); G06F 2200/1634 (2013.01); H04B 1/3888 (2013.01)

(58) Field of Classification Search
CPC .. G02B 1/04; G02B 1/14; G02B 1/111; G02B 1/118; G02B 1/11
See application file for complete search history.

(56) References Cited

U.S. PATENT DOCUMENTS

2015/0301667 A1* 10/2015 Yano ................ G06F 3/0412
                                                      345/173
2016/0370505 A1* 12/2016 Koo .................. H01L 27/14685
2019/0023860 A1*  1/2019 Kim .................. C08J 7/0427

FOREIGN PATENT DOCUMENTS

| JP | 2004234386 | 8/2004 |
|---|---|---|
| JP | 2013254026 | 12/2013 |
| JP | 2015015621 | 1/2015 |

(Continued)

OTHER PUBLICATIONS

International Search Report—PCT/KR2017/013384 dated Feb. 5, 2018.

*Primary Examiner* — Blane J Jackson
(74) *Attorney, Agent, or Firm* — Cantor Colburn LLP (57) ABSTRACT

Provided is a transparent member having fine uneven portions, which is applied to a portable device, has a reduced thickness and improved concealment, and reduces a haze and a step caused by a print layer. The transparent member includes an attachment layer applied to a transparent substrate or an anti-scattering film. The transparent substrate or the anti-scattering film, which is translucent due to the fine uneven portions, becomes transparent due to the attachment layer that penetrates into a space between the fine uneven portions.

9 Claims, 8 Drawing Sheets

(56) References Cited

FOREIGN PATENT DOCUMENTS

| KR | 20100102788 | 9/2010 |
| KR | 20110125383 | 11/2011 |
| KR | 20150038709 | 4/2015 |
| KR | 20150042072 | 4/2015 |

* cited by examiner

TRANSPARENT MEMBER HAVING FINE UNEVEN PORTIONS AND APPLIED TO PORTABLE DEVICE

TECHNICAL FIELD

The present invention relates to a transparent member having fine uneven portions, and more particularly, to a transparent member applied to a protective sheet and a window of a portable device via fine uneven portions.

BACKGROUND ART

In display devices, a display such as a liquid crystal display (LCD), an organic light-emitting diode (OLED), or an electronic paper display (EPD) forms a screen. Such display devices are applied to various kinds of visual display units and employ a touch screen to provide convenience of operation. A window is arranged on a front surface of a touch screen and protects a display device from being damaged by external impact or contact. In addition, a protective sheet is attached to a window of a portable device to protect the window. With the recent advent of flexible displays, a window and a protective sheet for the flexible displays have been required. Such window and protective sheet other than a print layer are transparent members.

Figure 1:
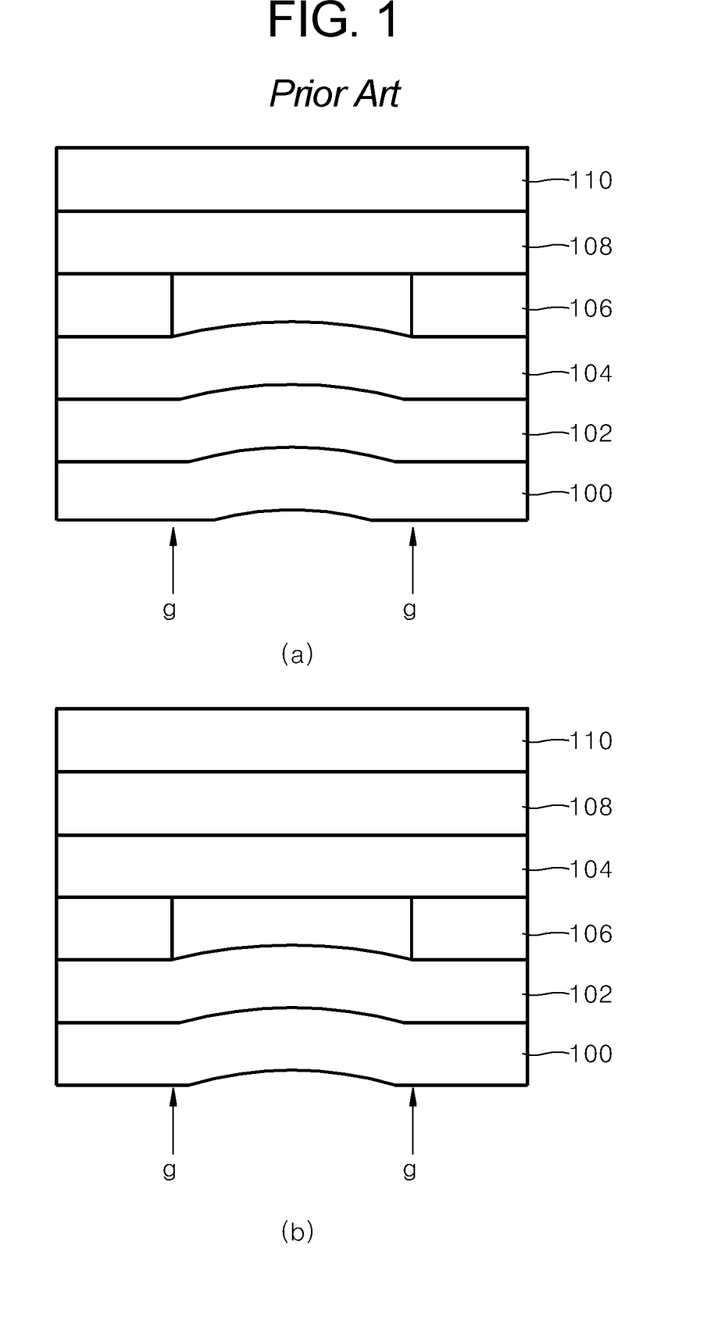
FIG. 1 is diagrams of conventional transparent members including a print layer.

FIG. 1 are diagrams of conventional transparent members including a print layer. Referring to FIG. 1, the transparent members are formed by sequentially stacking a pressure-sensitive adhesive layer 100, an anti-scattering film 102, an adhesive layer 104, a region including a print layer 106, a transparent substrate 108, and a functional layer 110. When necessary, the adhesive layer 104 is, for example, arranged between the transparent substrate 108 and the print layer 106 in a different layer structure. The print layer 106 is in a bezel area. The print layer 106 may be on a bottom surface of the transparent substrate 108, as shown in (a), or may be between the adhesive layer 104 and the anti-scattering film 102, as shown in (b). Although not shown, the print layer 106 may be simultaneously arranged on each of the bottom surface of the transparent substrate 108 and the top surface of the anti-scattering film 102. The print layer 106 is described in detail in Korea Patent No. 2015-0038709.

The print layer 106 usually has a thickness of several micrometers, causing a step "g" in the pressure-sensitive adhesive layer 100. When there is the step "g" and the transparent member is attached to an object such as a window or a touch screen, a portion including the step "g" is not completely attached to the object, but an air bubble or the like is created. A method of forcedly attaching the pressure-sensitive adhesive layer 100 to an object by increasing adhesion of the pressure-sensitive adhesive layer 100 may be considered, but the adhesion of the pressure-sensitive adhesive layer 100 cannot be set higher than necessary to allow the transparent member to be easily removed. On the other hand, when the print layer 106 is excessively thin, the concealment of the print layer 106, and more particularly, the concealment of a selectively used white print layer is decreased. Therefore, the print layer 106 needs to have an appropriate thickness.

To overcome the step "g", various layer structures have been tried. To reduce the step "g", a distance between the pressure-sensitive adhesive layer 100 and the print layer 106 may be increased, or the thickness of the print layer 106 may be decreased. However, when the distance between the pressure-sensitive adhesive layer 100 and the print layer 106 is increased, the thickness of the transparent member is increased. When the thickness of the print layer 106 is decreased, the concealment of the print layer 106 is decreased, and accordingly, an inner structure is seen by the naked eyes from outside. Meanwhile, the thinner the print layer 106, the better, as long as the concealment of the print layer 106 is satisfied. This is because that when the print layer 106 is thick, a haze occurs due to a refractive index difference in an end of the print layer 106.

DISCLOSURE

Technical Problem

Provided is a transparent member having fine uneven portions, which is applied to a portable device, has a reduced thickness and improved concealment, and reduces a haze and a step caused by a print layer.

Technical Solution

According to an aspect of the present invention, a transparent member, which has fine uneven portions and is applied to a portable device, includes a transparent substrate and a laminated sheet laminated to the transparent substrate, wherein the fine uneven portions are arranged on a surface of each of an edge and a central portion of the transparent substrate and allow the transparent substrate to become translucent by giving roughness to the surface via bends. At this time, the laminated sheet includes an anti-scattering film and an attachment layer, and the attachment layer penetrates in a space between the fine uneven portions and allows the transparent substrate to be changed from a translucent state to a transparent state.

The transparent substrate may include one selected from a glass substrate, a plastic substrate, and a stack substrate in which the glass substrate and the plastic substrate are stacked. The attachment layer may enable the laminated sheet to be removably attached to the transparent substrate or to be bonded to the transparent substrate. The fine uneven portions may be directly implemented on the transparent substrate or implemented in a separate layer on the window. The fine uneven portions may be arranged in a pattern selected from a line pattern, a grid pattern, an island pattern, and a combination thereof. The fine uneven portions may have a shape selected from a cylindrical shape, a hemispheric shape, a pyramid shape, a prismoid shape, and a combination thereof. The fine uneven portions may include a bead or one of a bead and a binder. The transparent member may further comprise a transparent print layer on an uneven interface in the edge.

According to another aspect of the present invention, a transparent member, which has fine uneven portions and is applied to a portable device, includes an anti-scattering film and a laminated sheet laminated to the anti-scattering film, wherein the fine uneven portions are arranged on a surface of each of an edge and a central portion of the anti-scattering film and allow the anti-scattering film to become translucent by giving roughness to the surface via bends. At this time, the laminated sheet includes a transparent substrate and an attachment layer, the attachment layer penetrates in a space between the fine uneven portions and allows the anti-scattering film to be changed from a translucent state to a transparent state, and a print layer is formed on fine uneven portions in the edge.

The fine uneven portions may be directly implemented on the anti-scattering film or implemented in a separate layer on the anti-scattering film. The print layer may be a background print layer on an uneven interface in the edge of the anti-scattering film. The print layer may be a color print layer on an uneven interface in an edge of the transparent substrate.

Advantageous Effects

According to the present invention, a transparent member, which has fine uneven portions and is applied to a portable device, may have a reduced thickness and improved concealment by utilizing the fine uneven portions. In addition, the transparent member may reduce a haze and a step caused by a print layer and may increase printability and adhesion.

MODE FOR INVENTION

Hereinafter, the present invention will now be described in detail with reference to the attached drawings. Embodiments described below may have different forms, and the scope of the present invention is not limited to the descriptions set forth herein. Rather, these embodiments are provided so that the present invention will be fully conveyed to those skilled in the art. In the drawings, the thickness of a film (e.g., a layer or a pattern) or a region may be exaggerated for clarity. In addition, when a film (e.g., a layer or a pattern) is referred to as being "on", "on a top of", "on a bottom of", or "on a surface of" another film (e.g., a layer or a pattern), it can be directly on the other film (e.g., a layer or a pattern), or intervening films (e.g., layers or patterns) may also be present.

Embodiments of the present invention provide a transparent member, which has a reduced thickness and improved concealment and reduces a haze and a step caused by a print layer, by using fine uneven portions. A procedure for reducing the thickness of each of the transparent member and the print layer using the fine uneven portions will be individually described. A portable device used in the embodiments is any image processing device such as a mobile device, a data processing terminal, or a television. As the mobile device, there is a cellular phone, a smart phone, or a tablet. As the data processing terminal, there is an automated teller machine (ATM) or a kiosk.

A transparent member provided by embodiments of the present invention refers to a protective sheet, which protects a window or a touch screen of a portable device, or the window of the portable device. The portable device may be flat or include a curved surface or may be flexible. In particular, a portable device including a curved surface refers to a device that has a curved surface in an edge and/or a central portion. As a portable device having a curved surface in both the edge and the central portion thereof, there is a flexible display. According to the embodiments of the present invention, the portable device is divided into an edge and a central portion. Usually, the edge includes a bezel area in which a print layer is arranged. When necessary, a screen may extend from the central portion to the edge. Hereinafter, a region of the transparent member, which corresponds to the edge of the portable device, is referred to as an edge "a" and a region of the transparent member, which corresponds to the central portion of the portable device, is referred to as a central portion "b".

Figure 2:
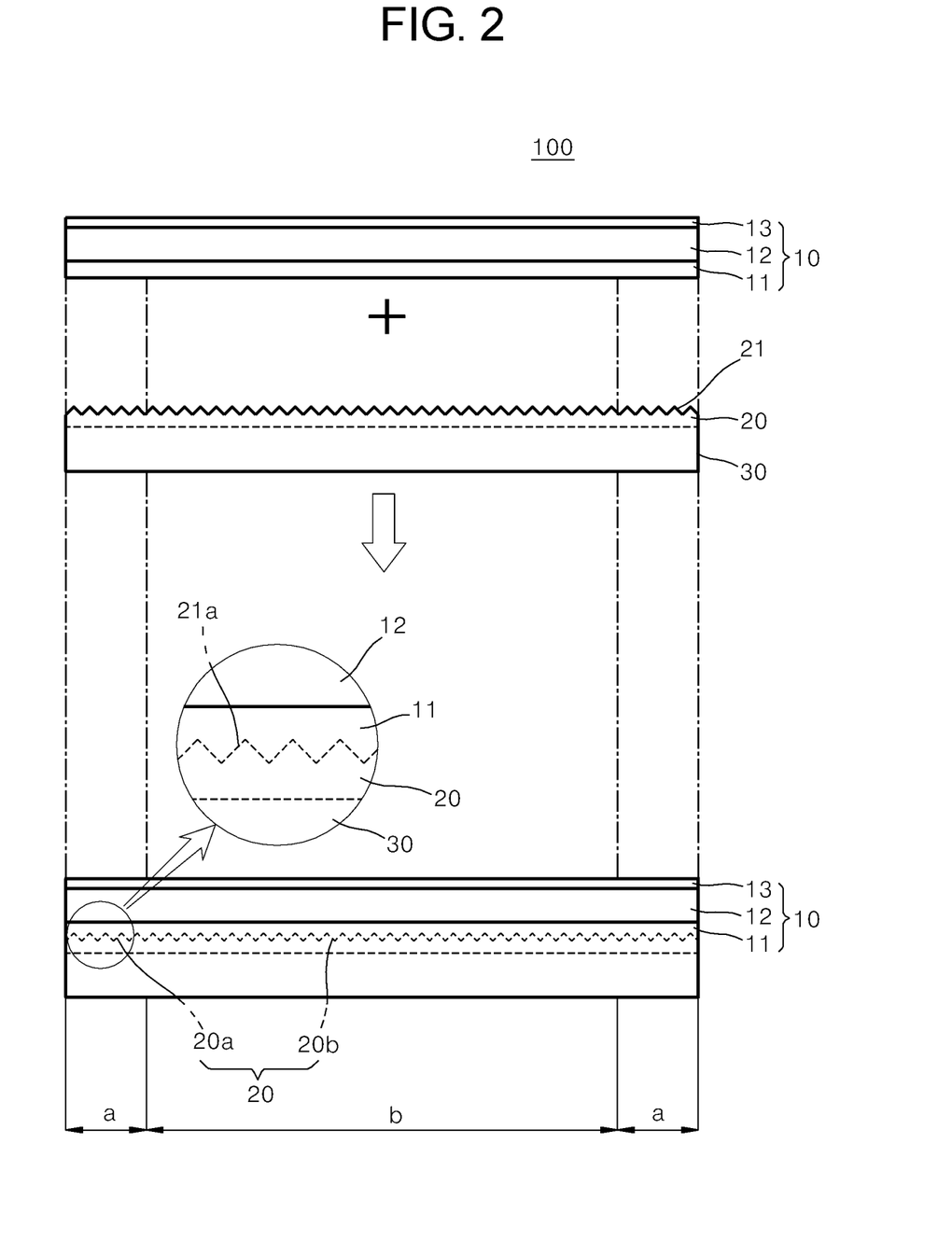
FIG. 2 is an exploded cross-sectional view of a first transparent member according to the present invention.

FIG. 2 is an exploded cross-sectional view of a first transparent according to an embodiment of the present invention. However, FIG. 2 may not be a cross-sectional view in the strict sense, and elements that may not be shown in the cross-sectional view may be illustrated for convenience of description.

Referring to FIG. 2, the first transparent member 100 is divided into the edge "a" and the central portion "b". The screen of a portable device may be extended from the central portion "b" to the edge "a". Usually, a print layer is formed in the edge "a". The first transparent member 100 includes a transparent substrate 30, which includes fine uneven portions 20, and a first laminated sheet 10, which is laminated to the transparent substrate 30. The first laminated sheet 10 includes an attachment layer 11, an anti-scattering film 12, and a functional layer 13. The attachment layer 11 is coated with a transparent pressure-sensitive adhesive or a transparent adhesive and, for example, may be acrylic resin, silicon resin, epoxy resin, urethane resin, or a composite resin thereof. The attachment layer 11 may enable the first laminated sheet 10 to be removably attached to the transparent substrate 30 via a pressure-sensitive adhesive or to be permanently bonded to the transparent substrate 30 via an adhesive.

Any transparent plastic material may be used for the anti-scattering film 12. For example, the plastic material may include thermoplastic resin. Desirably, the plastic material may include at least one selected from polyethylene terephthalate (PET), polyethylene naphthalate (PEN), polyether sulfone (PES), polyimide (PI), polyarylate (PAR), polycarbonate (PC), polymethyl methacrylate (PMMA), polyurethane (PU), tri-acetyl cellulose (TAC), and cycloolefin copolymer (COC).

The functional layer 13 may provide properties such as anti-fingerprint, anti-reflection, blue light block, electromagnetic shielding, privacy, antibiotic action, etc. For example, an anti-fingerprint coating layer providing an anti-fingerprint function may be formed by performing wet coating of fluorine coating liquid or dry coating of fluorine coating liquid using vacuum deposition. The functional layer may be an anti-fingerprint glass substrate, an anti-fingerprint and antibacterial-treated glass substrate, an anti-fingerprint hard plastic substrate, or an anti-fingerprint and antibacterial-treated hard plastic substrate. As described above, the coating may enable the first laminated sheet 10 to exhibit various functions.

Any transparent material may be limitlessly used for the transparent substrate 30. For example, the transparent substrate 30 may include a glass substrate or a plastic substrate. In detail, the glass substrate may be tempered glass, and the plastic substrate may include thermoplastic resin. Desirably, the plastic substrate may include at least one selected from PET, PEN, PES, PI, PAR, PC, PMMA, PU, TAC, and COC.

The transparent substrate 30 may have a stack structure in which tempered glass and a plastic substrate are stacked in multiple layers.

Selectively, the transparent sheet 30 may include slim tempered glass having a thickness of about 10 μm to about 150 μm. The slim tempered glass has a failure mechanism whereby cracks occur without shards of glass. Since there are no scattering shards and no sharp edges, there are no shards by which users may be stabbed or injured or in which users may breathe. The slim tempered glass is freely bent and is thus efficient when applied to curved portable devices.

The fine uneven portions 20 are formed on a surface of the transparent substrate 30 and collectively refer to things that are not flat but have a bend so as to give a roughness to a surface. The bend may have an angle, a curvature, or a combination thereof. For example, the fine uneven portions 20 may have a band shape having a constant width, a cylindrical shape, a hemispheric shape, a pyramid shape, e.g., a triangular pyramid shape, a prismoid shape, e.g., a triangular prismoid shape, or a combination thereof. In other words, the shape of the fine uneven portions 20 may vary without departing from the scope of the present invention. The fine uneven portions 20 will be described in detail by explaining examples illustrated in FIGS. 3 and 4. The fine uneven portions 20 have an uneven interface 21 matching the shape thereof.

The fine uneven portions 20 are formed using various methods. For example, the fine uneven portions 20 may be formed by mixing a translucent bead, e.g., a silica bead, with ultraviolet (UV)- or thermal-curing resin or the like, coating an attaching/detaching target layer with the mixture, and performing hardening. In addition, after being coated with UV- or thermal-curing resin or the like, the attaching/detaching target layer may be compressed using a sheet or roll mold engraved with a shape for the fine uneven portions 20 and then hardened. A film or sheet coated with UV- or thermal-curing resin or the like may be transferred to the attaching/detaching target layer. The fine uneven portions 20 may be formed via molding using a mold having a shape matching the fine uneven portions 20.

Alternatively, the fine uneven portions 20 may be formed by coating the attaching/detaching target layer with resin or the like after masking the attaching/detaching target layer, or the fine uneven portions 20 may be formed using exposure or etching and then a mask may be removed. The fine uneven portions 20 may be directly formed in a surface of the attaching/detaching target layer using a laser beam. The fine uneven portions 20 may be formed by directly printing the fine uneven portions 20 on the surface of the attaching/detaching target layer using UV- or thermal-curing ink. The fine uneven portions 20 may be formed on the surface of the attaching/detaching target layer by directly applying physical impact on the surface of the attaching/detaching target layer. The fine uneven portions 20 formed using the methods described above may be directly implemented on the transparent substrate 30 or may be implemented in a separate layer, which is marked with a dashed line.

According to an embodiment of the present invention, when the first laminated sheet 10 is attached to the transparent substrate 30 having the fine uneven portions 20, the attachment layer 11 of the first laminated sheet 10 penetrates into a space between the fine uneven portions 20, and accordingly, a translucent screen changes into a transparent one. In the drawings, a transparent uneven interface 21a formed when the attachment layer 11 of the first laminated sheet 10 penetrates into the space between uneven interfaces 21a is marked with a dashed line. Accordingly, even when the transparent substrate 30 having the fine uneven portions 20 is used, the clear vision of the screen in a transparent state is maintained.

The fine uneven portions 20 provide various effects such as anti-fingerprint, antipollution, and anti-reflection. When the fine uneven portions 20 are present, a portion smeared with a fingerprint or a pollutant is made discontinuous so that formation of the fingerprint or adherence of the pollutant is prevented. In detail, a protrusion of the fine uneven portions 20 may be smeared with a fingerprint or a pollutant, but the fingerprint or the pollutant does not adhere to a recess of the fine uneven portions 20. Accordingly, the fine uneven portions 20 have effects of anti-fingerprint and antipollution. Therefore, the transparent substrate 30 including the fine uneven portions 20 may not need to have a separate anti-fingerprint function.

Meanwhile, the uneven interface 21a induces fine diffuse reflection as compared to the case where the fine uneven portions 20 are not present. The diffuse reflection blocks external light from being reflected from a screen corresponding to the first transparent member 100. Light reflection from the screen causes the glare effect. The fine uneven portions 20 may reduce the glare effect. In addition, the diffuse reflection allows light, which travels straight from a display, to be diffusely reflected, thereby increasing concealment, particularly, in the edge "a". Furthermore, since the fine uneven portions 20 have a recess, an air bubble is easily discharged. In other words, the fine uneven portions 20 enable the first laminated sheet 10 to be stably attached to the transparent substrate 30.

According to an embodiment of the present invention, the fine uneven portions 20 of the first transparent member 100 are classified into first uneven portions 20a in the edge "a" and second uneven portions 20b in the central portion "b". Since the screen of a portable device extends across the central portion "b" or across the central portion "b" and the edge "a", the second uneven portions 20b may be considered to correspond to the screen of the portable device. As described above, the second uneven portions 20b may have a glare reducing effect or the like.

Figure 3:
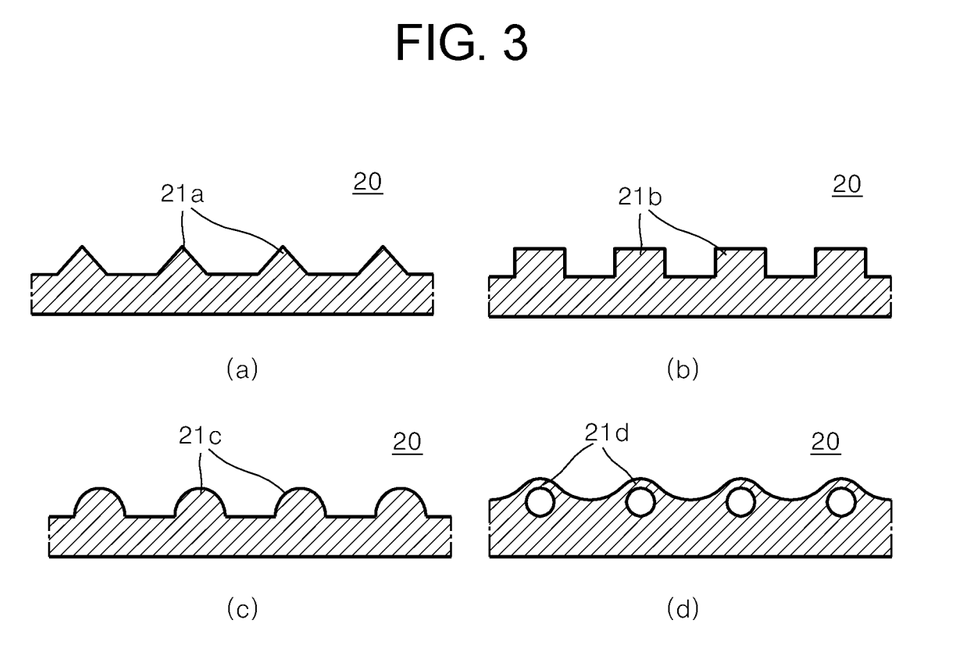
FIG. 3 is cross-sectional views of examples of fine uneven portions in FIG. 2.

FIG. 3 is cross-sectional views of examples of the fine uneven portions 20 of the transparent substrate 30 in FIG. 2.

Referring to FIG. 3, the fine uneven portions 20 having various shapes are formed on the transparent substrate 30. There are some examples here. In the examples, the uneven interface of the fine uneven portions 20 is molded into a shape selected from a triangular shape 21a, a rectangular shape 21b, and a hemispheric shape 21c or is formed using a bead or a bead and a binder 21d. In other words, the interface of the fine uneven portions 20 may have an angle, a curvature, or a combination thereof. When the fine uneven portions 20 are formed on the transparent substrate 30, the transparent substrate 30 becomes translucent and thus has light transmittance decreased. Since the light transmittance of the transparent substrate 30 having the fine uneven portions 20 is decreased, the transparent substrate 30 is visually distinguished from a transparent window that does not have the fine uneven portions 20.

Figure 4:
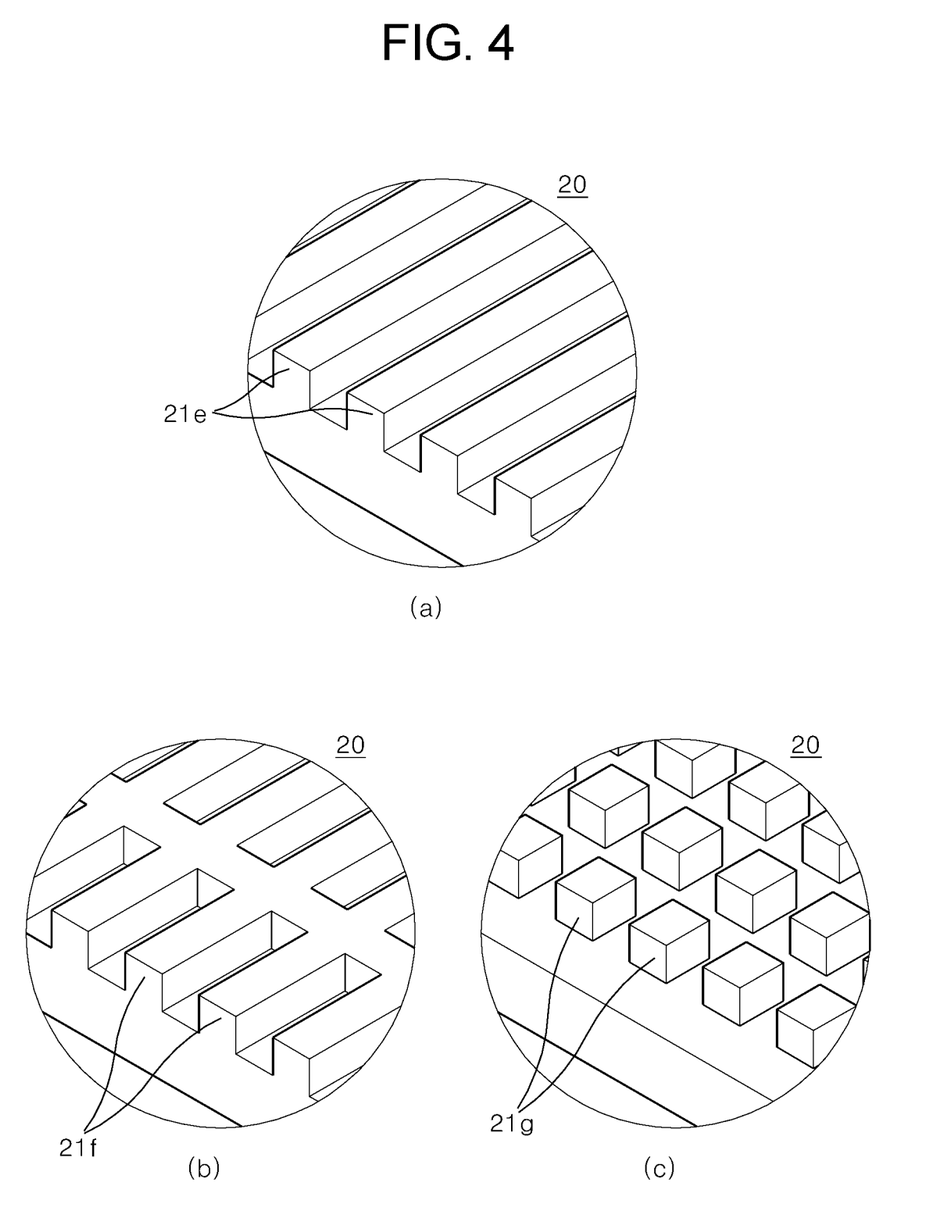
FIG. 4 is partial perspective views of examples of the arrangement of the fine uneven portions in FIG. 2.

FIG. 4 is partial perspective views of examples of the arrangement of the fine uneven portions 20 of the transparent substrate 30 in FIG. 2.

Referring to FIG. 4, the fine uneven portions 20 may be arranged in a line pattern 21e (a), a grid pattern 21f (b), or an island pattern 21g (c). At this time, there are given examples of the arrangement of the fine uneven portions 20 in the case where the interface of the fine uneven portions 20 has the rectangular shape 21b. However, the interface of the fine uneven portions 20 may be molded into the rectangular shape 21b or the hemispheric shape 21c or may be formed using a bead or a bead and the binder 21d. In other words, the interface of the fine uneven portions 20 may have an angle, a curvature, or a combination thereof. In addition, the fine uneven portions 20 may be regularly arranged at regular intervals or may be irregularly arranged without regular intervals.

Figure 5:
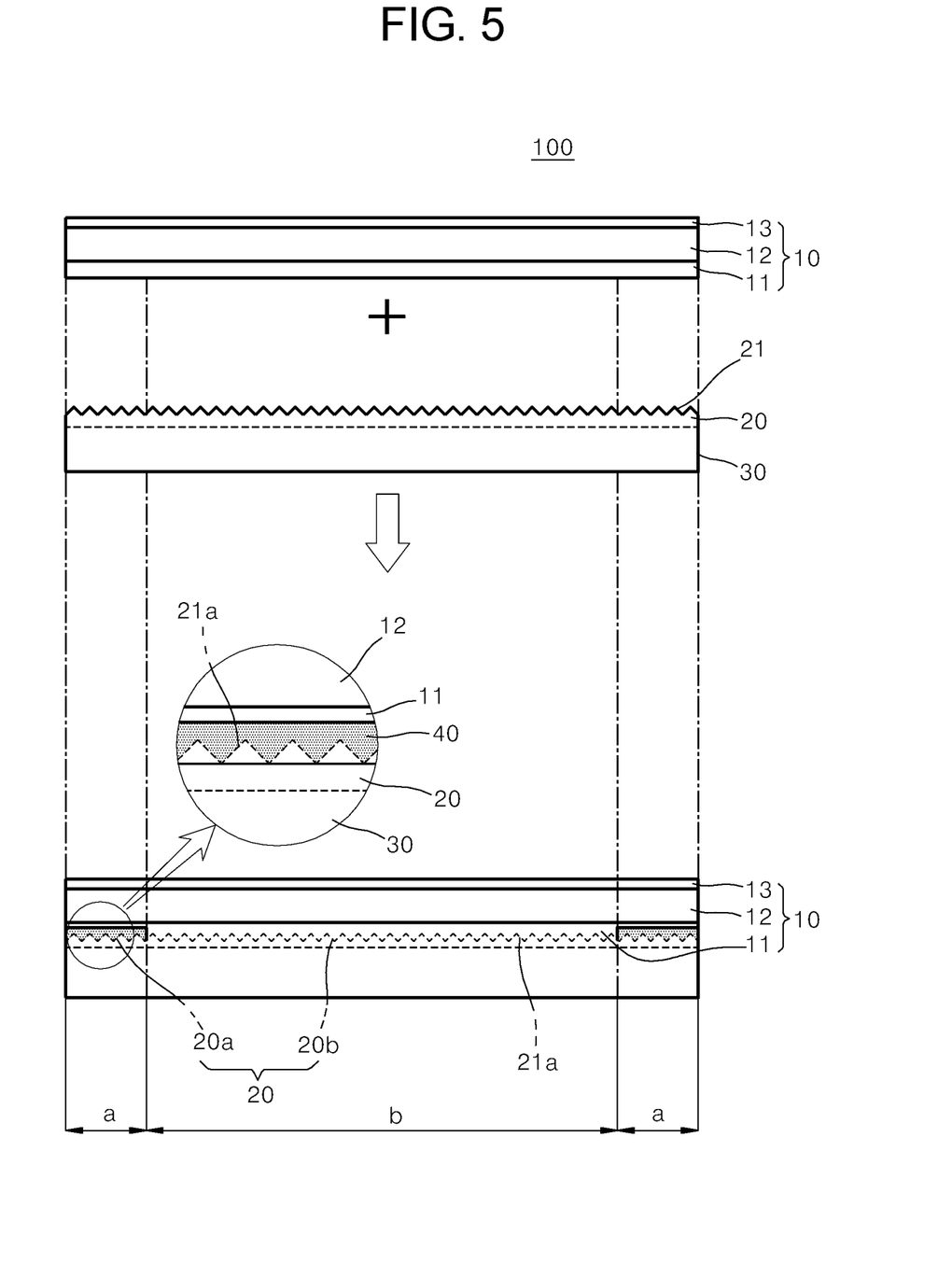
FIG. 5 is an exploded cross-sectional view of a second transparent member according to the present invention.

FIG. 5 is an exploded cross-sectional view of a second transparent member according to the present invention. The second transparent member 200 is the same as the first transparent member 100, with the exception of addition of a transparent print layer 40. Therefore, detailed descriptions of elements denoted by the same reference numerals will be omitted. Here, the uneven interface 21a of FIG. 3 is described as an example of the uneven interface 21.

Referring to FIG. 5, the transparent print layer 40 is arranged on uneven interfaces 21a in the edge "a". The transparent print layer 40 is a print layer which is transparent. The transparent print layer 40 may include metal oxide, such as indium tin oxide (ITO), antimony tin oxide (ATO), or ZnO, or a material, such as Cu, a conductive polymer, or a silver nanowire, which gives conductivity. The transparent print layer 40 penetrates into the space between fine uneven portions 20a along the uneven interfaces 21a. Accordingly, on the basis of the same properties, the transparent print layer 40 may be thinner than in the case where there are no fine uneven portions 20a. For example, while a conventional print layer with no fine uneven portions has a thickness of several micrometers, the thickness the transparent print layer 40 of the second transparent member 200 having the fine uneven portions 20a is less than the several micrometers. This is because the same properties may be realized since the contact area between the fine uneven portions 20a and the transparent print layer 40 is large.

When the thickness of the transparent print layer 40 is decreased, diffuse reflection from the fine uneven portions 20a destructively interferes with an end portion of the transparent print layer 40 so that a haze disappears. In addition, the adhesion of the transparent print layer 40 increases due to the anchor effect as compared to a conventional one. Furthermore, since the surface area of the fine uneven portions 20a increases, the printability of the transparent print layer 40 is enhanced, thereby facilitating printing.

Figure 6:
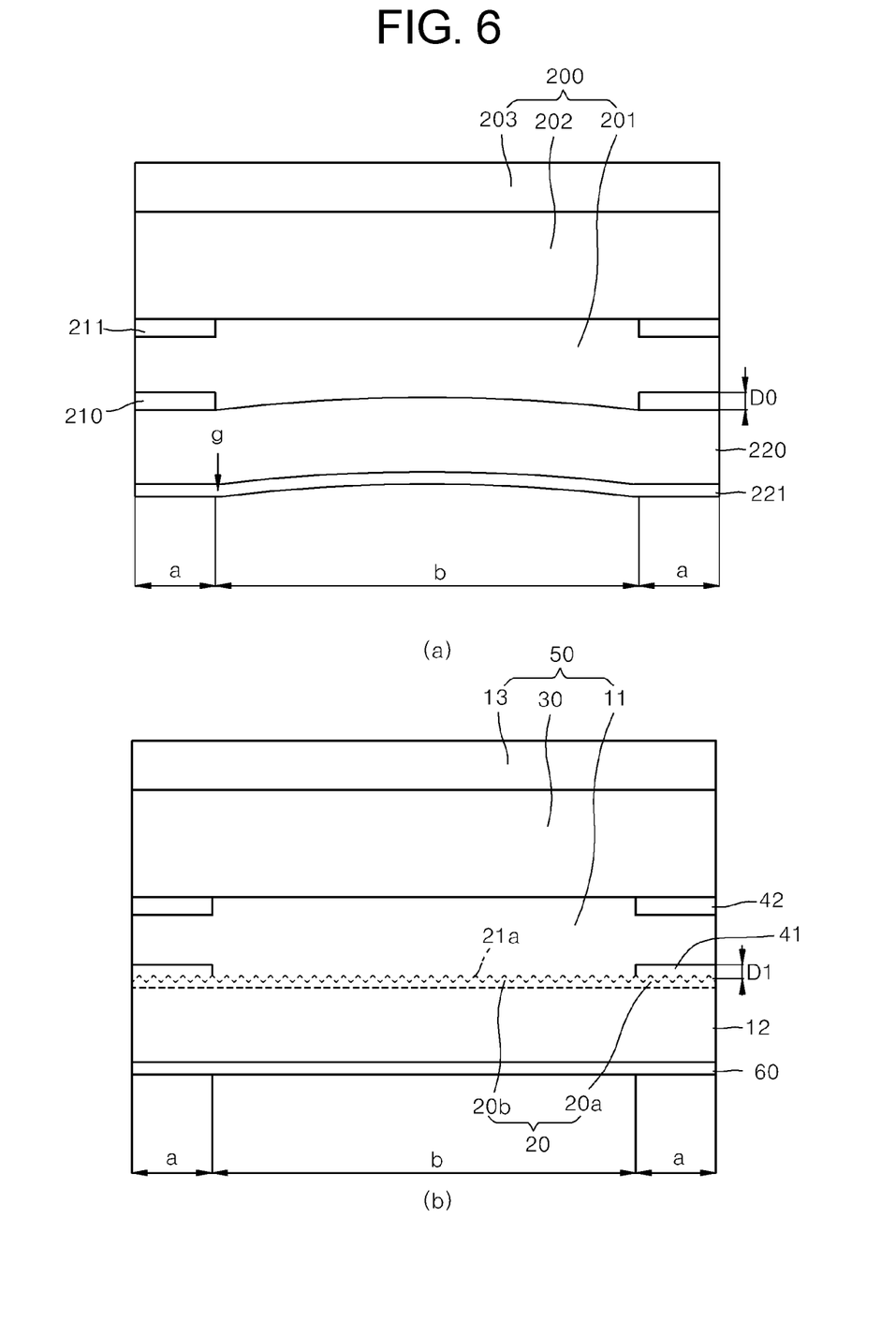
FIG. 6 is cross-sectional views for comparison between a third transparent member according to the present invention and a conventional transparent member.

FIG. 6 is cross-sectional views for comparison between a third transparent member 300 according to the present invention and a conventional transparent member. At this time, the third transparent member 300 is the same as the transparent member 200, with the exception of switched positions of the anti-scattering film 12 and the transparent substrate 30. Therefore, detailed descriptions of elements denoted by the same reference numerals will be omitted.

Referring to FIG. 6, the fine uneven portions 20 are arranged at one side of the anti-scattering film 12 in the third transparent member 300. A background print layer 41 is on the fine uneven portions 20a of the edge "a", and a color print layer 42 is on a bottom of the transparent substrate 30, which is opposite the background print layer 41 with respect to the attachment layer 11. The background print layer 41 is usually white, and the color print layer 42 may be a monochrome or polychrome print layer. A laminated sheet including the transparent substrate 30 is referred to as a second laminated sheet 50 to be distinguished from the first laminated sheet 10 of the first and second transparent members 100 and 200. A pressure-sensitive adhesive layer 60 applied to the anti-scattering film 12 facilitates attachment to and detachment from an object (e.g., a window or a touch screen). The fine uneven portions 20 may be directly implemented on the anti-scattering film 12, as described with reference to FIG. 2 or may be formed in a separate layer, which is marked with a dashed line.

The pressure-sensitive adhesive layer 60 has an adhesion of 0.1 gf/25 mm to 500 gf/25 mm. The pressure-sensitive adhesive layer 60 may include various materials within the scope of the present invention and, for example, may include acrylic resin, silicon resin, epoxy resin, urethane resin, or a composite resin thereof. The pressure-sensitive adhesive layer 60 may be a pocket-type removable fluid layer containing a fluid or a removable pattern formed through partial hardening. The removable fluid layer includes an adhesive surface bonded to a transparent sheet in a pocket shape, a pressure-sensitive adhesive surface attached to a display component, and a side surface forming a sidewall between the adhesive surface and the pressure-sensitive adhesive surface. The pocket provides a space filled with a liquid fluid. In the removable pattern, a pressure-sensitive adhesive layer having an adhesion of about 0.1 gf/25 mm to about 500 gf/25 mm and a hardened layer formed by hardening the pressure-sensitive adhesive layer form a pattern. The pressure-sensitive adhesive layer 60 has self-adhesiveness. The self-adhesiveness allows the pressure-sensitive adhesive layer 60 to spontaneously adhere to an object without an air bubble even when the pressure-sensitive adhesive layer 60 is simply put on the object.

Hereinafter, the third transparent member 300 according to the present invention is compared with a conventional transparent member. The anti-scattering film 12 of the third transparent member 300 corresponds to a conventional anti-scattering film 220, the pressure-sensitive adhesive layer 60 corresponds to a conventional pressure-sensitive adhesive layer 221, the background print layer 41 corresponds to a conventional background print layer 210, the color print layer 42 corresponds to a conventional color print layer 211, and the second laminated sheet 50 corresponds to a conventional second laminated sheet 200. Accordingly, the attachment layer of the second laminated sheet 50 is the same as a conventional attachment layer 201, the transparent substrate 30 is the same as a conventional transparent substrate 202, and the functional layer 13 is the same as a conventional functional layer 203. At this time, unlike the first and second transparent members 100 and 200, the attachment layers 11 and 201 may respectively enable the second laminated sheets 50 and 200 to be respectively bonded to the anti-scattering film 12.

When the third transparent member 300 is compared with the conventional transparent member, the conventional background print layer 210 has a thickness D0 and the background print layer 41 of the third transparent member 300 has a thickness D1. In other words, since the background print layer 41 penetrates into the space between the fine uneven portions 20a, according to the present invention, the thickness D1 is less than the thickness D0. Accordingly, the thickness of the background print layer 41 is decreased. In addition, the concealment of the background print layer 41 is much greater than that of the conventional background print layer 210. Since diffuse reflection occurs in the fine uneven portions 20a according to the present invention, the concealment of the background print layer 41 is increased. Therefore, even though the background print layer 41 of the third transparent member 300 is thin, the third transparent member 300 may realize high concealment.

When the concealment is high, the clarity of the background print layer 41 is increased such that the background print layer 41 may effectively function as a background. In other words, even when the background print layer 41 of the third transparent member 300 is thin, the background print layer 41 is printed with high concealment and may thus effectively function as the background of the color print layer 42. Meanwhile, the conventional background print layer 210 usually has a thickness of several micrometers, which causes the step "g" in the conventional pressure-sensitive adhesive layer 221. When there is the step "g" and the conventional transparent member is attached to an object such as a window or a touch screen, a portion including the step "g" is not completely attached to the object, but an air bubble or the like is created. Contrarily, according to the present invention, the background print layer 41 of the third transparent member 300 relatively greatly reduces the step "g". Although exaggerated in the drawings, it is illustrated that the step "g" is not present.

It is apparent that the above-described properties contributed by the fine uneven portions 20a are all applied to the background print layer 41 of the third transparent member 300. For example, the properties include a haze, adhesion, printability, and so on. Accordingly, these properties will not be described in detail. In addition, the technical ideas of the background print layer 41 of the third transparent member 300 are all applied to the transparent print layer 40 of the second transparent member 200.

Figure 7:
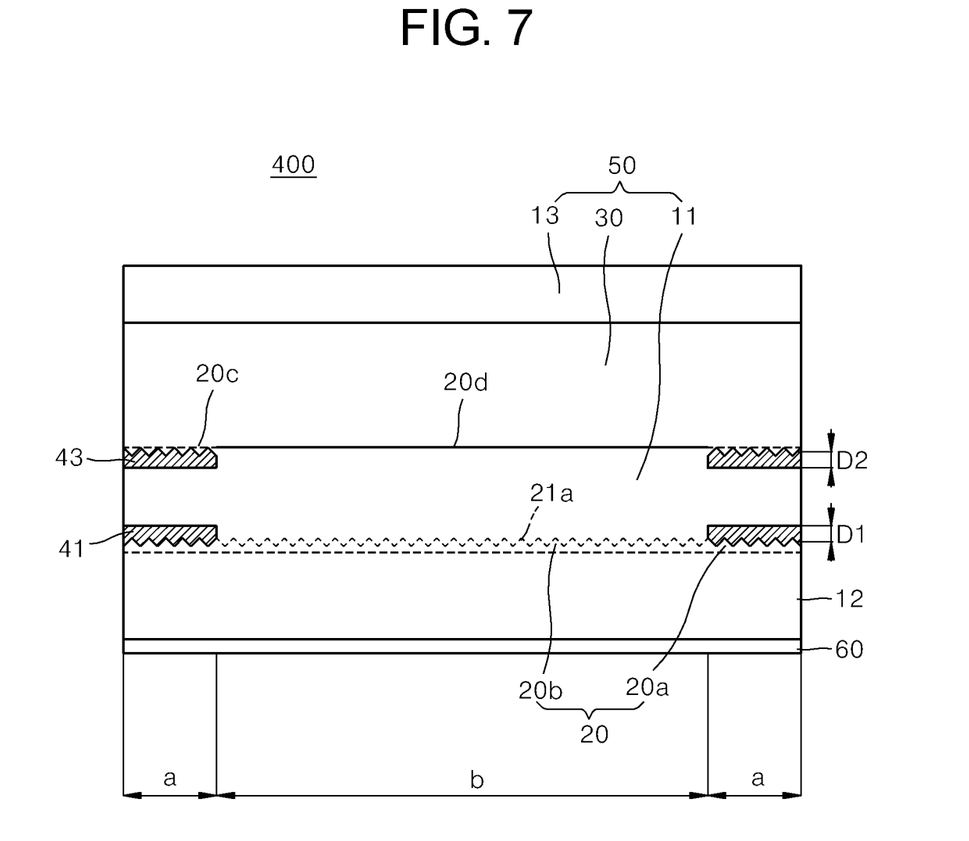
FIG. 7 is a cross-sectional view of a fourth transparent member according to the present invention.

FIG. 7 is a cross-sectional view of a fourth transparent member 400 according to the present invention. The fourth transparent member 400 is the same as the third transparent member 300, with the exception of addition of third uneven portions 20c in a color print layer 43. Therefore, redundant descriptions will be omitted.

Referring to FIG. 7, the color print layer 43 of the fourth transparent member 400 is arranged on the third uneven portions 20c in the edge "a". The third uneven portions 20c are arranged on the transparent substrate 30. The color print layer 43 has a thickness D2, which is less than the thickness of the color print layer 42 of the third transparent member 300. For the reason why the thickness D2 is less than the thickness of the color print layer 42, the third transparent member 300 will be referred to. When the thickness of the color print layer 43 is decreased, the fourth transparent member 400 may further reduce the step "g" as compared to the third transparent member 300.

Figure 8:
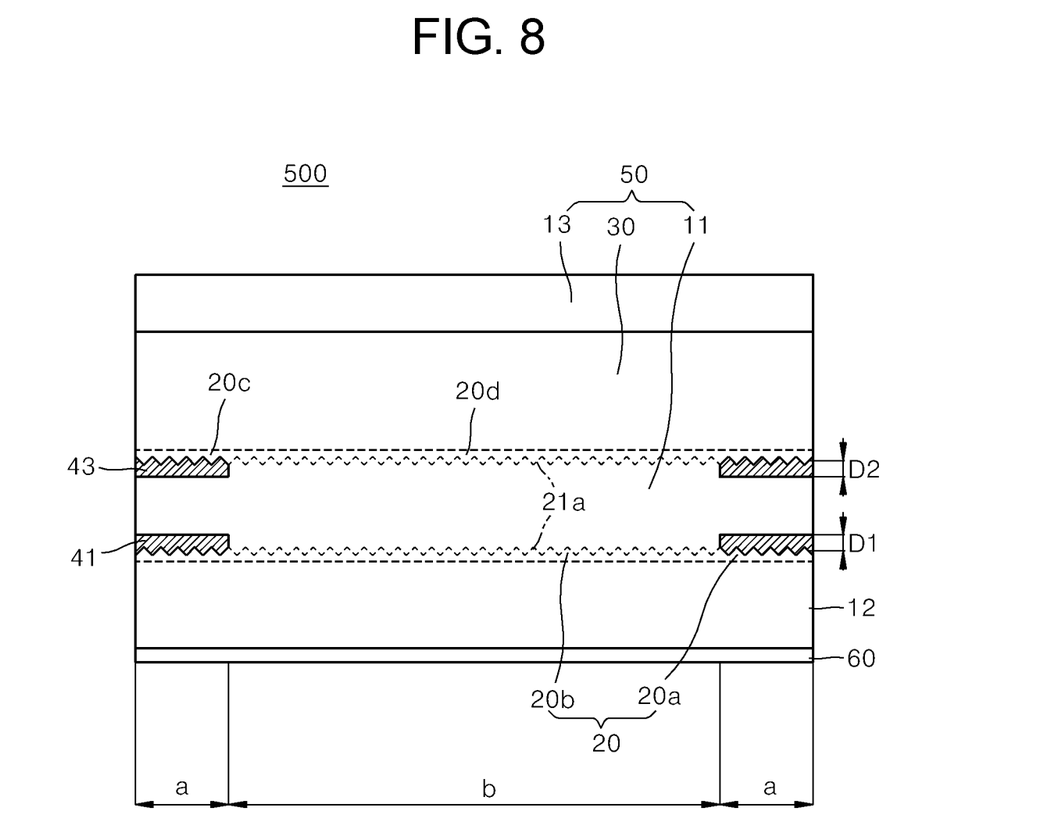
FIG. 8 is a cross-sectional view of a fifth transparent member according to the present invention.

FIG. 8 is a cross-sectional view of a fifth transparent member 500 according to the present invention. The fifth transparent member 500 is the same as the fourth transparent member 400, with the exception of addition of fourth uneven portions 20d in the central portion "b" of the transparent substrate 30. Therefore, redundant descriptions will be omitted.

Referring to FIG. 8, the fifth transparent member 500 further includes the fourth uneven portions 20d in the central portion "b" of the transparent substrate 30. The fourth uneven portions 20d shows various effects such as anti-fingerprint, antipollution, and anti-reflection, which have been described above with respect to the fine uneven portions 20. In addition, the uneven interface 21a induces fine diffuse reflection as compared to the case where the fine uneven portions 20 are not present. The diffuse reflection blocks external light from being reflected from a screen corresponding to the fifth transparent member 500. Light reflection from the screen causes the glare effect. The fourth uneven portions 20d may reduce the glare effect. In addition, since the fourth uneven portions 20d have a recess, an air bubble is easily discharged.

While the present invention has been described in detail with reference to embodiments, it is not limited to the embodiments. It will be understood that various modifications can be made in the embodiments by those skilled in the art without departing from the scope of the technical ideas of the present invention. For example, although a laminated sheet is focused on in the descriptions of the embodiments, the concept of the present invention may also be applied to a touch screen, a touch screen cover layer, and a display.

The invention claimed is:

1. A transparent member having fine uneven portions and applied to a portable device, the transparent member comprising:
    an anti-scattering film; and
    a laminated sheet laminated to the anti-scattering film,
    wherein the fine uneven portions are arranged on a surface of each of an edge and a central portion of the anti-scattering film and allow the anti-scattering film to become translucent by giving roughness to the surface via bends,
    the laminated sheet includes a transparent substrate and an attachment layer,
    the attachment layer penetrates in a space between the fine uneven portions and allows the anti-scattering film to be changed from a translucent state to a transparent state, and
    a print layer is formed on fine uneven portions in the edge.

2. The transparent member of claim 1, wherein the fine uneven portions are directly implemented on the anti-scattering film or implemented in a separate layer on the anti-scattering film.

3. The transparent member of claim 1, wherein the fine uneven portions are arranged in a pattern selected from a line pattern, a grid pattern, an island pattern, and a combination thereof.

4. The transparent member of claim 1, wherein the fine uneven portions have a shape selected from a cylindrical shape, a hemispheric shape, a pyramid shape, a prismoid shape, and a combination thereof.

5. The transparent member of claim 1, wherein the fine uneven portions include a bead or one of a bead and a binder.

6. The transparent member of claim 1, wherein the print layer is a background print layer on an uneven interface in the edge of the anti-scattering film.

7. The transparent member of claim 1, wherein the print layer is a color print layer on an uneven interface in an edge of the transparent substrate.

8. A transparent member having fine uneven portions and applied to a portable device, the transparent member comprising:
    a transparent substrate; and
    a laminated sheet laminated to the transparent substrate,
    wherein the fine uneven portions are arranged on a surface of each of an edge and a central portion of the transparent substrate and allow the transparent substrate to become translucent by giving roughness to the surface via bends,
    the laminated sheet includes an anti-scattering film and an attachment layer, and
    the attachment layer penetrates in a space between the fine uneven portions and allows the transparent substrate to be changed from a translucent state to a transparent state,
    wherein the fine uneven portions include a bead or one of a bead and a binder.

9. A transparent member having fine uneven portions and applied to a portable device, the transparent member comprising:
- a transparent substrate; and
- a laminated sheet laminated to the transparent substrate,
- wherein the fine uneven portions are arranged on a surface of each of an edge and a central portion of the transparent substrate and allow the transparent substrate to become translucent by giving roughness to the surface via bends,
- the laminated sheet includes an anti-scattering film and an attachment layer,
- the attachment layer penetrates in a space between the fine uneven portions and allows the transparent substrate to be changed from a translucent state to a transparent state, and
- a transparent print layer is formed on an uneven interface in the edge.

\* \* \* \* \*